United States Patent
Hu (10) Patent No.: US 11,388,445 B1
(45) Date of Patent: Jul. 12, 2022

(54) MOSQUITO NOISE SMOOTHING BETWEEN DIFFERENT VIDEO SUBSECTIONS ENCODED WITH DIFFERENT COMPRESSION METHODS WITHIN A VIDEO FRAME

(71) Applicant: Yendo Hu, San Diego, CA (US)

(72) Inventor: Yendo Hu, San Diego, CA (US)

(*) Notice: Subject to any disclaimer, the term of this patent is extended or adjusted under 35 U.S.C. 154(b) by 0 days.

(21) Appl. No.: 17/691,268

(22) Filed: Mar. 10, 2022

(51) Int. Cl.
| | |
|---|---|
| H04N 19/86 | (2014.01) |
| H04N 19/172 | (2014.01) |
| H04N 19/124 | (2014.01) |
| H04N 19/157 | (2014.01) |
| H04N 19/117 | (2014.01) |

(52) U.S. Cl.
CPC ........ *H04N 19/86* (2014.11); *H04N 19/117* (2014.11); *H04N 19/124* (2014.11); *H04N 19/157* (2014.11); *H04N 19/172* (2014.11)

(58) Field of Classification Search
None
See application file for complete search history.

(56) References Cited

U.S. PATENT DOCUMENTS

| | | |
|---|---|---|
| 6,600,839 B2 | 7/2003 | Mancuso |
| 7,003,174 B2 | 2/2006 | Kryukov |
| 8,750,390 B2 | 6/2014 | Sun |
| 9,204,170 B2 | 12/2015 | Smith |
| 11,089,247 B2 | 8/2021 | Cote |
| 11,172,215 B2 | 11/2021 | Rusanovskyy |
| 2014/0098189 A1* | 4/2014 | Deng ............... H04N 19/176 348/43 |
| 2020/0396501 A1* | 12/2020 | Lapicque ......... H04N 21/433 |
| 2022/0116616 A1* | 4/2022 | Xiu ................. H04N 19/117 |

OTHER PUBLICATIONS

Wiegand et al., Overview of the H.264/AVC Video Coding Standard, pp. 560-576, IEEE Transactions on Circuits and Systems for Video Technology, vol. 13, No. 7, Jul. 2003.
Sullivan et al., Overview of the High Efficiency Video Coding (HEVC) Standard, pp. 1649-1668, IEEE Transactions on Circuits and Systems for Video Technology, vol. 22, No. 12, Dec. 2012.
Proposed SMPTE Standard for for Television 1920 × 1080 Image Sample Structure, Digital Representation and Digital Timing Reference Sequences for Multiple Picture Rates, SMPTE 274M, Revision of SMPTE 274M-2003, pp. 1-29.
SMPTE Standard for Television Bit-Serial Digital Interface for High-Definition Television Systems, ANSI/SMPTE 292M-1996, pp. 1-9.

* cited by examiner

*Primary Examiner* — Stuart D Bennett
(74) *Attorney, Agent, or Firm* — Meagher Emanuel Laks Goldberg & Liao, LLP (57) ABSTRACT

At least a method and an apparatus are provided for efficiently encoding or decoding a video frame to smooth out or reduce visual distortions such as mosquito noise between different video subsections encoded with different compression methods within a video frame. For example, a plurality of surrounding neighboring video subsections of the video frame are compressed using a first compression method (e.g., inter coding), with an associated first compression parameter set. The center video subsection of the video frame is twice compressed, first with the same first compression method, then with a different, second compression method (e.g., intra coding). Therefore, the mosquito noise or visual artifact is reduced between the video subsections encoded with the different compression methods.

10 Claims, 7 Drawing Sheets

400

| Neighbor Sub-section (Inter) 401 | Neighbor Sub-section (Inter) 402 | Neighbor Sub-section (Inter) 403 |
|---|---|---|
| Neighbor Sub-section (Inter) 420 408 | Center Sub-section (Intra) 410 409 | Neighbor Sub-section (Inter) 404 |
| Neighbor Sub-section (Inter) 407 | Neighbor Sub-section (Inter) 406 | Neighbor Sub-section (Inter) 405 |

| Neighbor Sub-section (Inter) 401 | Neighbor Sub-section (Inter) 402 | Neighbor Sub-section (Inter) 403 |
|---|---|---|
| Neighbor Sub-section (Inter) 420 408 | Center Sub-section (Intra) 410 409 | Neighbor Sub-section (Inter) 404 |
| Neighbor Sub-section (Inter) 407 | Neighbor Sub-section (Inter) 406 | Neighbor Sub-section (Inter) 405 |

| 701 | filtering/pre-filitering a plurality of surrounding neighboring video subsections of a video frame |
| 702 | compressing the filtered plurality of surrounding neighboring video subsections using a first compression method with an associated first compression parameter set |
| 703 | filtering/pre-filitering a center video subsection of a video frame |
| 704 | compressing the filtered center video subsection using the first compression method with the associated first compression parameter set |
| 705 | decompressing the compressed filtered center video subsection using a first decompression method corresponding to the first compression method |
| 706 | compressing again the decompressed filtered center video subsection using a second compression method |
| 707 | forming the output compressed video frame wherein the output compressed video frame comprising the plurality of compressed filtered surrounding neighboring video subsections surrounding the compressed again decompressed filtered center video subsection |

Figure 7

MOSQUITO NOISE SMOOTHING BETWEEN DIFFERENT VIDEO SUBSECTIONS ENCODED WITH DIFFERENT COMPRESSION METHODS WITHIN A VIDEO FRAME

TECHNICAL FIELD

At least one of the present embodiments generally relates to a method or an apparatus for video encoding or decoding, and more particularly, to a method or an apparatus for efficiently providing video compression and/or decompression utilizing mosquito noise smoothing or reduction between different video subsections encoded with different compression methods within a video frame.

BACKGROUND

To achieve high compression efficiency, image and video coding schemes usually employ prediction, including motion vector prediction, and transform to leverage spatial and temporal redundancy in the video content. Generally, intra or inter prediction/coding/decoding is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transformation, and prediction.

Digital content delivery space has gained significant importance and emphasis as the content sources move from a physical form into an electronic network transmission form. As the core wide area transmission networks, e.g. wide area networks (WAN), gain maturity and stability to support broad regions, edge networks, including the metropolitan networks (MAN), the last mile networks (such as, e.g., DSL, cable, mobile cell, and/or fixed point wireless networks) have taken revolutionary changes in technological approaches to deliver electronic content to an end user.

The consumer demand for information and content in real-time over the network cloud has not only increased, it has also broadened to cover the telephone and television services, which were traditionally delivered through dedicated independent national and edge networks. The converged network delivery vision is turning into reality.

Multimedia information in its native digital form is often too large for any reasonable network to deliver. Given the fact that the target recipient, the human, can tolerate lossy degradation of this class of content, compression has taken the role in resolving the multimedia delivery bottleneck. Almost all multimedia content are going through some form of compression. Major standards were developed to support this effort, including MPEG1, MPEG2, H.261, H.263, H.264, H.265, AVC, HEVC, ATSC, AVS, and etc.

Advances in compression continue to improve the compression effectiveness. As mentioned above, the current state of the art involves a tool box set of interdependent techniques to achieve final compression results. Within the tool box, there are two classes of methods that is of particular interest: intra encoding verses inter encoding. Typically, intra encoding predicts from information newly generated within the current frame to reconstruct the current frame, whereas, inter encoding leverages information of temporally different frames, including both future and past frames.

SUMMARY

The drawbacks and disadvantages of the prior art are solved and addressed by one or more aspects described herein.

Therefore, according to an embodiment, a method performed by an apparatus is presented having one or more processors for encoding an input video frame into an output compressed video frame, wherein the input video frame comprising a plurality of surrounding neighboring video subsections surrounding a center video subsection, the method comprising: filtering the plurality of surrounding neighboring video subsections; compressing the filtered plurality of surrounding neighboring video subsections using a first compression method with an associated first compression parameter set; filtering the center video subsection; compressing the filtered center video subsection using the first compression method with the associated first compression parameter set; decompressing the compressed filtered center video subsection using a first decompression method corresponding to the first compression method; compressing again the decompressed filtered center video subsection using a second compression method; forming the output compressed video frame wherein the output compressed video frame comprising the plurality of compressed filtered surrounding neighboring video subsections surrounding the compressed again decompressed filtered center video subsection.

According to another embodiment, an apparatus is presented for encoding an input video frame into an output compressed video frame, wherein the input video frame comprising a plurality of surrounding neighboring video subsections surrounding a center video subsection, the apparatus comprising: at least a memory; one or more processors configured to: filter the plurality of surrounding neighboring video subsections; compress the filtered plurality of surrounding neighboring video subsections using a first compression method with an associated first compression parameter set; filter the center video subsection; compress the filtered center video subsection using the first compression method with the associated first compression parameter set; decompress the compressed filtered center video subsection using a first decompression method corresponding to the first compression method; compress again the decompressed filtered center video subsection using a second compression method; form the output compressed video frame wherein the output compressed video frame comprising the plurality of compressed filtered surrounding neighboring video subsections surrounding the compressed again decompressed filtered center video subsection.

DETAILED DESCRIPTION

One aspect of the present embodiments relates to a recognition that the reconstruction method between the intra and inter encoding/decoding is fundamentally different, and therefore, the resulting distortion artifacts such as mosquito noise between the two compression/decompression methods are also very different.

In addition, multimedia sequence reconstruction under transmission error conditions is critical to lossy transmission systems. Such systems may include wireless, congested wired network, and processing limited networks. An approach to rebuild the sequence after an error hit is to introduce intra encoding. Intra encoding can be introduced incrementally at local sections of a picture, or it can be introduced over the entire picture.

For low latency applications, the need for incremental progressive periodic video sequence refresh is a requirement. Full intra encoded frames are often too large, resulting in a longer compressed data delivery time, pushing out the overall video latency. For progressive refresh implementations, introduction of an artificial intra encoded area within the image (such as, e.g., in the center video frame position), and then progressively covering the entire area through subsequent images results in the reconstruction of the video sequence.

As mentioned previously, one aspect of the present embodiments relates to a recognition by the present inventor that the reconstruction method between the intra and inter encoding/decoding is fundamentally different, and therefore resulting in mosquito noise distortion between the two different compression/decompression methods within a video sequence or a video frame.

Mosquito noise is a visible artifact that looks like fragments of a checkerboard pattern, or single pixel pattern located in flat or low level textured areas around strong edges. For example, it is a visual distortion that appears near crisp edges of objects in video frames that are compressed with the discrete cosine transform (DCT). It typically occurs at decompression when the decoding engine has to approximate the discarded data by inverting the transform model. The mosquito noise typically appears as random aliasing in these areas. As TVs get larger, mosquito noise and other artifacts become more noticeable.

Accordingly, one aspect of the present embodiments provides mosquito noise reduction processing/apparatus to reduce this art effect, particularly when blocks or subsections within a video frame are coded with different compression methods, such as, e.g., intra-coding or inter-coding. Therefore, present embodiments aim to reduce or smooth out the mosquito noise within a video frame.

Figure 4:
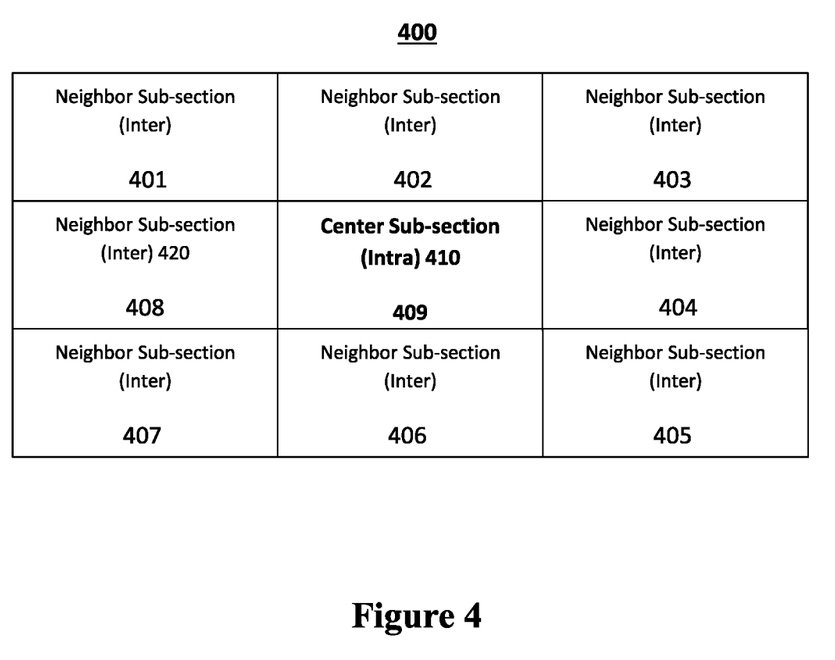
FIG. 4 illustrates a video frame having different video subsections being encoding with different compression methods according to aspects of the present embodiments.

Accordingly, FIG. 4 shows one exemplary embodiment of a video frame 400 according an aspect of the present embodiments. Frame 400 is a video frame which is meant to be progressively refreshed. When updating a center subsection 409 using a compression method (e.g., intra encoding 410), those sub-sections 401-408 that have been compressed over the past by inter encoding methods 420 will result in a change in a distortion within the local region that may be visible by a human observer, even though that the overall distortion of the frame 400 remains the same as before and in future. A subsection may be a block, a subblock, or a macroblock, etc. of the video frame 400.

The same content region 400, when encoded at the same level of quantization, will still result in a visually detectable difference when encoded by an intra coding method 410 versus the inter-coding method 420.

Accordingly, present embodiments provide an inventive solution to smooth out or reduce the visual distortion differences across adjacent image subsections (e.g., across 408 and 409) having different compression methods (420, 410).

Figure 5:
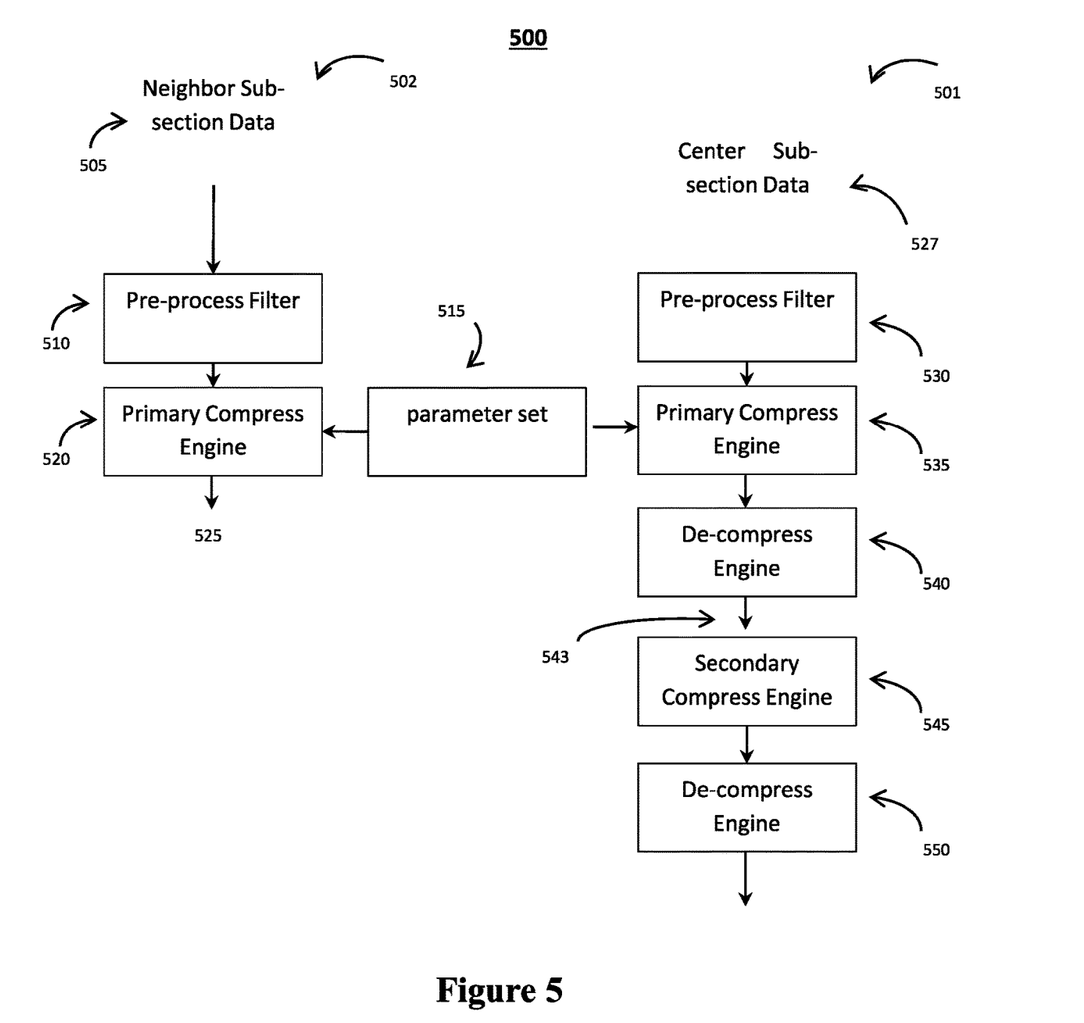
FIG. 5 illustrates another block diagram of an embodiment of a video encoder/encoding process within which aspects of the present embodiments may be implemented.

FIG. 5 illustrates an exemplary process and/or system 500 in which various aspects and embodiments are implemented. FIG. 5 shows a process and/or system 500 to reduce or smooth out the mosquito noise contributed by the different compression methods of the subsections of the video frame 400. Accordingly, for example, given a video frame 400 with surrounding sub-sections 401-408 compressed by a primary encoding method (e.g., inter coding 420), and a center subsection 409 compressed by a secondary encoding method (e.g., intra coding 410), the mosquito noise for center sub-section 409 compressed by the secondary method will be matched with the surrounding neighbor subsections 401-408 by an exemplary dual pass encoding process/system 500 shown in FIG. 5.

As illustrated in FIG. 5, video data 527 representing the center subsection 409 in FIG. 4 are pre-process filtered 530, compressed 535, and then de-compressed 540 with the primary compression engine/process (e.g., inter coding as in FIG. 4) using a common parameter set 515 used by all the neighbor subsections 401-408 in FIG. 4. In an additional or a second pass, the reconstructed video data outputted from de-compressing engine 540 are additionally compressed by another compression engine/process to compress the reconstructed video data using the secondary compression method that was used for the center sub-section 410 of video frame 400 in FIG. 4 (e.g., intra coding). The additionally compressed video data for this subsection 410 is then reconstructed or de-compressed 550. In one exemplary aspect, this second de-compression/reconstruction 550 is at a lower quantization setting than as it would have been set to normally. Accordingly, present embodiments effectively capturing the mosquito noise generated by the primary compress method into the secondary compressing method, thereby smoothing out or reducing the distortion or the mosquito noise across the two different compression methods.

Again, the encoding distortions including the mosquito noise of an image subsection of a video frame 400 is largely dependent on the encoding method used, which is mainly contributed by the pre-process filter 510, the compress engine 520, and the parameter set 515 used for that encoder/encoding. Accordingly, the corresponding mosquito noise is captured by four components in the process/apparatus of the FIG. 5: the input pre-processing filter 530, the compress engine 535, the parameter set 515 that configures the compress engine 535, and the de-compress engine 540 that reconstructs the input sub-section pixels with the same distortion. The distortion is effectively captured within the distorted pixels 543.

The compress engines/processes 520 530 545 may be of any type or class of compression methods, including but not limited to intra encoding, inter encoding, wavelet encoding, simple quantize methods, and etc. Within these encoding methods, pre-process filters 520 530 may include, but not limited to, noise reduction filters, low pass filters, motion compensation filters, or even transform domain filters.

Accordingly, present embodiments provide at least a method or an apparatus which will correlate mosquito noises from different compression methods within a video frame so that from a human perception perspective, the visual distortion across different compression methods is observed to be more uniform. The embodiments achieve this by capturing the noise distortion of a primary compression method in the secondary compression method. In doing so, the compressed sequence, when encoded with difference compression methods, will essentially have the noise of only the primary compression method.

Figure 2:
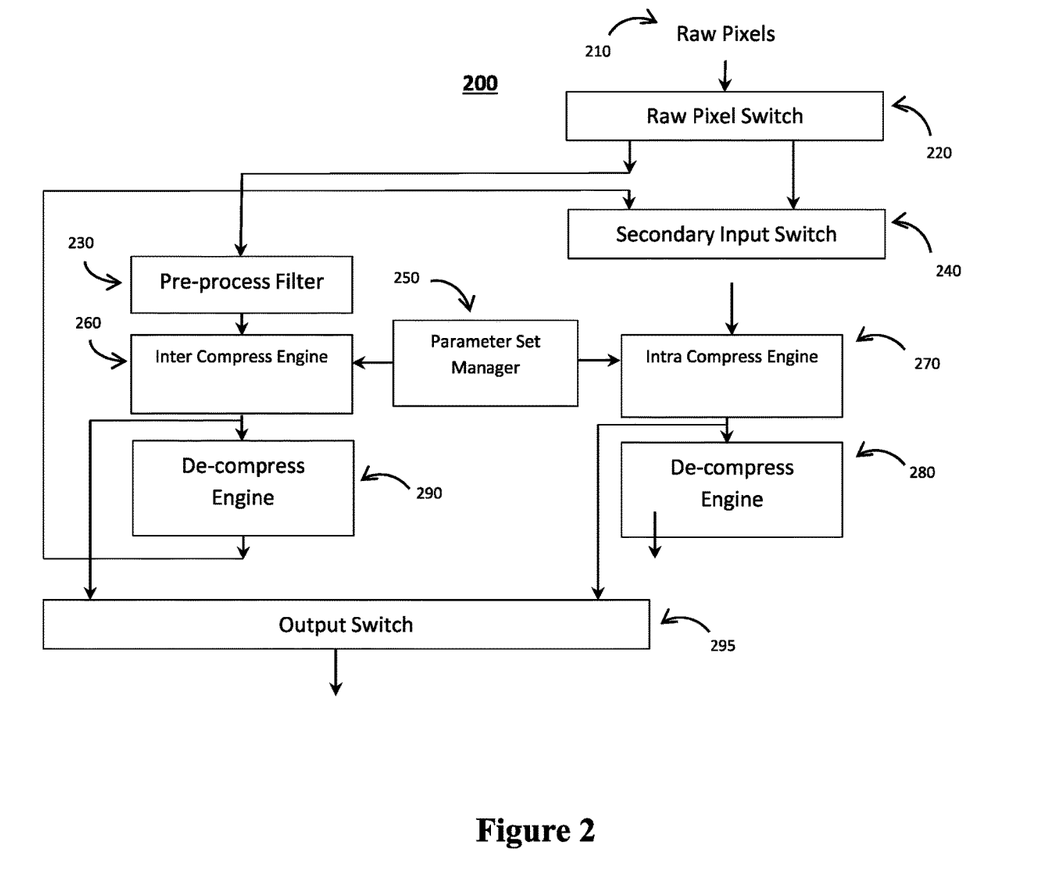
FIG. 2 illustrates another block diagram of an embodiment of a video encoder/encoding process within which aspects of the present embodiments may be implemented.

FIG. 2 illustrates an exemplary system 200 in which various aspects and embodiments are implemented. During a normal operation, when there is no need for any mosquito noise reduction or smoothing, the raw pixel data 210 are fed directly to either the Inter Compress Engine 260 or the Intra Compress Engine 270 through the Raw Pixel Switch 220. The Output Switch 295 will select accordingly the appropriate Compress Engine output to output an exemplary video frame 400 shown in FIG. 4.

As already described above, video frame 400 normally would comprise a center subsection 409 which is an area encoded using intra coding 410, and is surrounded by neighbor subsections 401-408 encoded using inter coding 420. But according to present embodiments, to smooth out the noise or distortion, for the encoding of the center subsection 409, the Raw Pixel Switch 220 will route the raw pixels 210 to the Inter Compress Engine 260 first (through Pre-process Filter 230) instead. The Inter Compress Engine 260 output is only used by the De-compress Engine 290. The Inter De-Compress Engine 290 output is then re-compressed by the Intra Compress Engine 270 via the Secondary Input Switch 240. In doing so, the distortion due to the first type of encoding is captured by the second type of encoding.

In an exemplary aspect of the present embodiments, a second encoding type may also be configured by the Parameter Set Manager 250 so that the additional distortion introduced by the second encoder is of a lower significance. Note that the first encoder has already removed a layer of information from the reconstructed data, thus, the second encoder will still offer good compression even though it is set to encode at a lower level of resolution. Only the output of the Intra De-compress Engine 270 output is delivered to the next stage of processing by the Output Switch 295.

Figure 3:
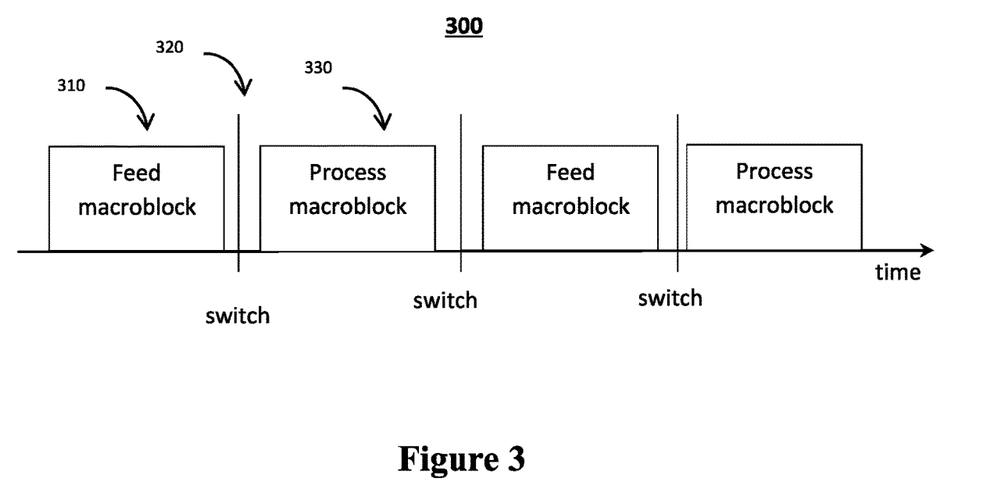
FIG. 3 illustrates switching of different compression methods according to aspects of the present embodiments.

The Parameter Set Manager 250 will deliver the appropriate parameter set (e.g., 515 shown in FIG. 5) to the Inter Compress Engine 260 and the Intra Compress Engine 270 at certain switching states ("switch") as illustrated FIG. 3. That is, the switches 240 295 and the Parameter Set Manager 250 in FIG. 2 will change states only at the feed 310 and the process 330 boundary 320, shown in FIG. 3. The Compress Engines 260 and 270 in FIG. 2 receive data 320 and process the data 330 sequentially following a two phase process 300, as shown in FIG. 3.

As already mentioned above, the different types of compression/encoding includes, but not limited to, intra encoding, inter encoding, bi-directional encoding, DCT transform encoding, wavelet encoding, and other types of lossy or lossless encoding. In addition, the encoding size of the encoding methods could be as small as a sub pixel, to as large as multiple frames. Other possible encoding sizes may include, but not limited to, 1 macroblock (16×16 pixels), 1 row of macroblocks, one column of macroblocks, multiple columns for multiple rows of macroblocks, entire frame of macroblocks, multiple frames of pixels, or one slice of pixels.

Again, according to present embodiments, to minimize mosquito noise, data sub-sections are classified into two categories: surrounding neighbor subsections 401 to 408, and a center sub-section 409. Each of these types of sub-sections follows a different processing flow, as illustrated in process/apparatus 500 in FIG. 5. The surrounding neighbor subsection data 505 follow a traditional process flow, going through first the pre-process filter 510 then a primary compress engine 520. The center subsection data 527 follows a dual pass encoding flow 530 535 540 545 550. The center subsection data 527 are first filtered by e.g., a pre-process filter 530 then encoded through a primary compress engine 535 using the same compression method as used by the primary compression engine 520 on the surrounding subsection data 505.

The compressed data from compress engine 535 are then de-compressed through a decompress engine 540, following a common parameter set 515. This common parameter set is used for both for the encoders in the neighbor subsections and the first encoding pass for the center sub-section. This primary compress engine is paired with decompress engine 540 which reconstructs the center subsection data 527 with distortion. This reconstructed distorted data are then re-encoded by the secondary compress engine 545, and decompress by the secondary decompress engine 550.

Figure 1:
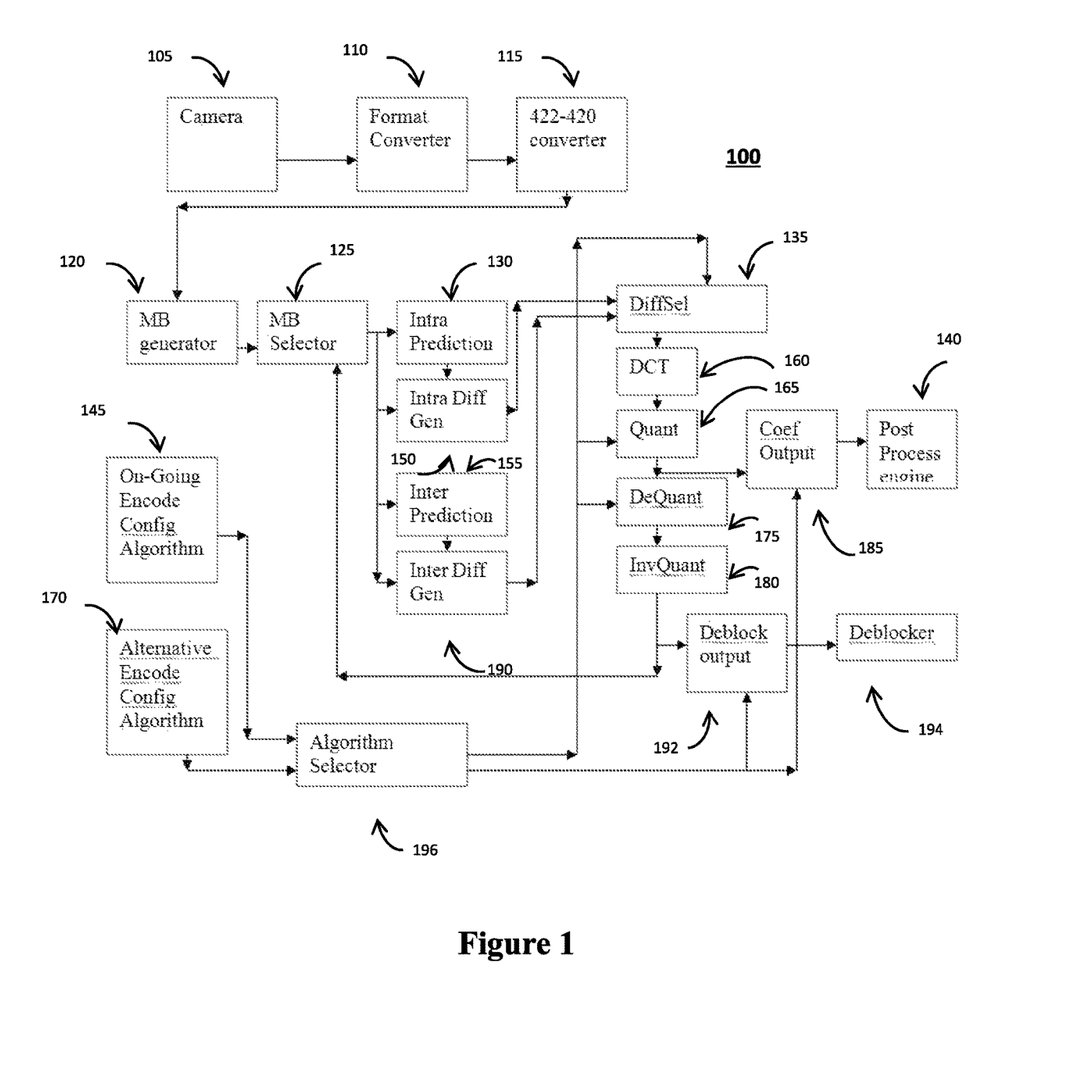
FIG. 1 illustrates a block diagram of an embodiment of a video encoder/encoding process within which aspects of the present embodiments may be implemented.

FIG. 1 illustrates an exemplary apparatus 100 in which various aspects and embodiments may be implemented. In this example, a H.264 AVC encoder is being modified according to the present embodiments to reduce or smooth out mosquito noise. A camera 105 will capture video and output uncompressed data in pixel raster scan form with 422 chroma format. The output will contain both luma and chroma pixels following, e.g., the HDSDI standards SMPT292 and SMPTE274. The uncompressed data, for this example, is 1080i format. The format converter 110 will convert the 1080i format into 720p format uncompressed output following the SMPTE292M. The 422-420 converter 115 will reduce the chroma pixel count by half following the specification spelled out in MPEG2 video compression standard. The output of the 422-420 converter will send the raster scan luma and chroma pixel data to the MB generator 120.

The macroblock, "MB", generator 120 will regroup the luma and chroma pixels in such a way so that it will output groups of 16×16 luma pixels, 8×8 Cb chroma pixels, and 8×8 Cr chroma pixels. The output macroblocks will have a relationship between each other such that they are located in raster scan locations as they come out of the MB generator. In other words, for a given video frame, the first MB will carry the Luma and chroma pixels with the top left 16×16 Luma pixel area. The second MB will carry the Luma and Chroma pixels starting at pixel 17 from the left corner of the picture, and pixel 1 from the top of the picture.

Under a normal condition, in which the encoding goal is to achieve best compression efficiency results, the on-going encoding configuration function 145 is turned on. In this case, the MB selector 125 will always route the MB generator 120 to the output. The intra predict engine 130 will predict the input MB using border pixel prediction, following, e.g., the H.264 AVC standard. The intra difference generator 150 will generate a difference output by subtracting the prediction output of the intra prediction engine 130 from the original pixels from the MB selector 125.

In parallel with the intra prediction engine 130 and the intra difference generator 150, the inter prediction engine 155 will predict the same set of pixels that the intra engines are working on. It will leverage the previous and future images in the sequence to predict the current set of MB pixels following the H.264 AVC standard. The inter difference generator 190 will then output the difference between the predicted data and the output date from the MB selector 125.

The on-going encode configuration algorithm 145 will then make a decision based on an algorithm. In one aspect according to the present embodiments, there is no constraints on the algorithm methodology. The Diff Select 135 will pass the difference pixels from either the intra diff engine 150 or the inter diff engine 190. The DCT engine 160 will carry out DCT transform following the H.264 AVC standard. The Quantizer 165 will carry out coefficient quantization following the H.264 AVC. The quantization level is set by the on-going encode configuration algorithm 145 to meet system objectives (e.g., band with constraint). The De-Quant engine 175 will carry out the inverse quantization following the H.264 AVC standard, using the same quantization level applied to the quantizer 165.

The inverse quantization engine 180 will carry out inverse DCT transform following the H.264 AVC standard. The output of the inverse quantizer 180 output is the reconstructed pixels. When the algorithm selector selects the on-going encode configuration algorithm 145, the reconstructed pixel output is then passed on to the deblock engine 194. The MB selector 125 will ignore the reconstructed pixels. The coefficients from the quantizer 185 are forwarded to the additional compression processing modules 140 to gain further compression gains, following the H.264 AVC when the on-going encode configuration algorithm 145 is selected.

The algorithm selector 196 can select the alternative Encoding Configuration Algorithm 170 for the purpose of introducing error recovery method, according to a mosquito noise reduction process as described before and herein. Accordingly, the alternative algorithm will initiate the following procedures so to force an intra encoding on the currently selected pixel output from the MB selector 125.

The alternative encoding configuration algorithm 170 will allow the intra prediction engine 130, the intra diff engine 150, the inter prediction engine 155, and the inter diff engine 190 to process the pixels from the MB generator by appropriately configuring the MB selector 125. It will follow the on-going encode configuration algorithm 145 to control the Diff Select engine 135 to select between the intra and inter encoded data, and the quantization levels for the quantizer 165 and the de-quantizer 175. The DCT 160, Quant 165, De-Quant 175, and Inv Quant 180 engines will process the data to generate the reconstructed pixels. This set of reconstructed pixels will not pass through to the deblocker 194. It will be blocked by the reconstruct pixel output module. The Coefficients from Quant engine 165 is prevented from reaching the post processing (e.g., 140) by disabling the coefficient output 185.

The reconstructed pixel data from the Inv Quant engine 180 is fed back to the intra prediction 130 and Intra diff 150 engines by appropriately configuring the MB selector 125. The alternative encoding configuration algorithm 170 will configure the Diff selector 135 to only select the intra diff generator 150 output for this second pass. The DCT 160, Quant 165, De Quant 175, and the Inv Quant 180 engines will also carry out a second pass at processing the intra data.

In one exemplary non-limiting embodiment, the alternative encoding configuration algorithm 170 will configure the quantizer 165 and the de-quantizer 175 with a quantization level that is lower than the on-going encoding configuration algorithm 145 settings so to properly capture the first pass encoding distortion. The coefficient output is enabled by the alternative encoding configuration algorithm 170, allowing the post processing compression engine(s)/processes 140 to work on this set of coefficients. The deblock output 192 is also enabled to allow the second pass reconstructed pixels to pass into the de-blocker for processing.

Figure 6:
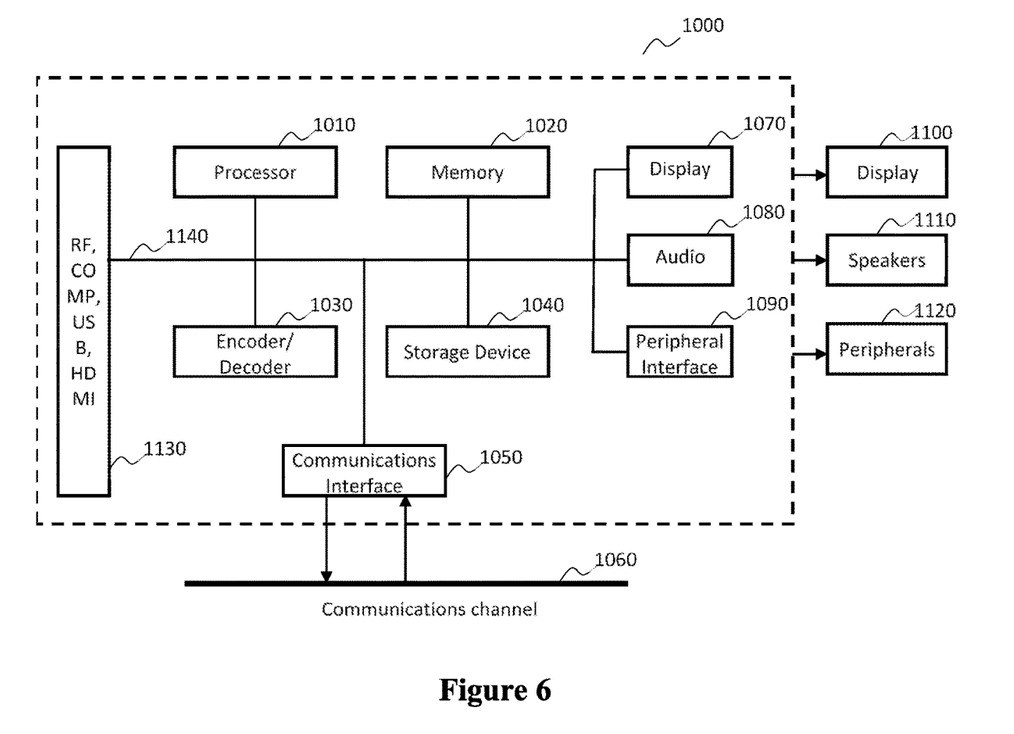
FIG. 6 illustrates a block diagram of an apparatus within which aspects of the present embodiments may be implemented.

FIG. 6 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), AVC, HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other devices. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Figure 7:
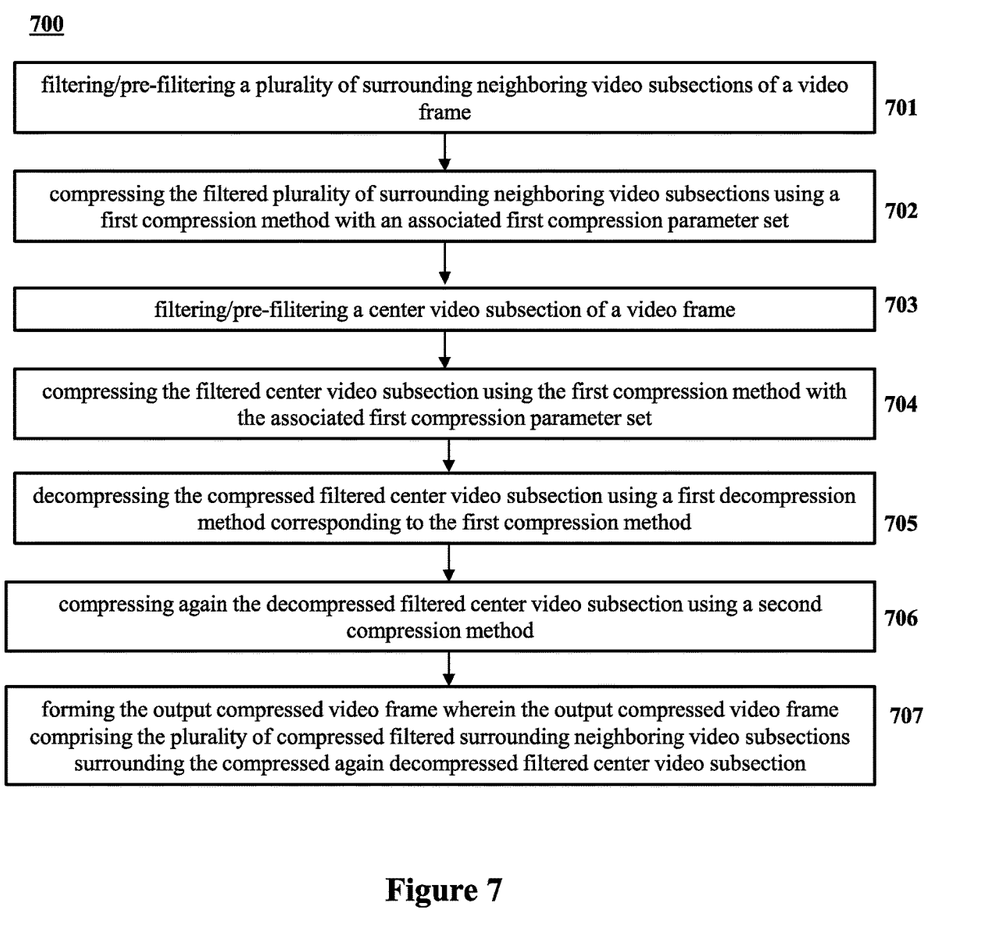
FIG. 7 illustrates a process within which aspects of the present embodiments may be implemented.

FIG. 7 illustrates an exemplary process/algorithm 700 for implementing aspects of present exemplary embodiments. At 701, process/algorithm 700 a plurality of surrounding neighboring video subsections of a video frame. At 702, process/algorithm 700 compresses the filtered plurality of surrounding neighboring video subsections using a first compression method with an associated first compression parameter set. At 703, process/algorithm 700 filters the center video subsection. At 704, process/algorithm 700 compresses the filtered center video subsection using the first compression method with the associated first compression parameter set. At 705, process/algorithm 700 decompresses the compressed filtered center video subsection using a first decompression method corresponding to the first compression method. At 706, process/algorithm 700 compresses again the decompressed filtered center video subsection using a second compression method. At 707, process/algorithm 700 forms the output compressed video frame wherein the output compressed video frame comprising the plurality of compressed filtered surrounding neighboring video subsections surrounding the compressed again decompressed filtered center video subsection.

In one aspect of the present embodiments, the mosquito noise reduced, doubly compressed video frame is able to be decoded by a standard compliant decoder such as one illustrated in FIG. 6. That is, for example, a video frame which is doubly compressed via blocks 530-550 in FIG. 5, using e.g., a HEVC compliant primary, inter-coding method and then a HEVC complaint secondary, intra-coding method, is still HEVC compliant. Therefore, according to one aspect of the present embodiments, in the above example, any HEVC complaint decoder will be able to decode the doubly compressed output video frame with no modifications.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of intra modes, or reference lines for intra prediction. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination.

The invention claimed is:

1. A method performed by an apparatus having one or more processors for encoding an input video frame into an output compressed video frame, wherein the input video frame comprising a plurality of surrounding neighboring video subsections surrounding a center video subsection, the method comprising:
    filtering the plurality of surrounding neighboring video subsections;
    compressing the filtered plurality of surrounding neighboring video subsections using a first compression method with an associated first compression parameter set;
    filtering the center video subsection;
    compressing the filtered center video subsection using the first compression method with the associated first compression parameter set;
    decompressing the compressed filtered center video subsection using a first decompression method corresponding to the first compression method;
    compressing again the decompressed filtered center video subsection using a second compression method;

forming the output compressed video frame wherein the output compressed video frame comprising the plurality of compressed filtered surrounding neighboring video subsections surrounding the compressed again decompressed filtered center video subsection.

2. The method of claim 1 where in the first compression method is inter coding.

3. The method of claim 2 where in the second compression method is intra coding.

4. The method of claim 3 further comprising quantizing using a first quantizing resolution to compress the filtered plurality of surrounding neighboring video subsections.

5. The method of claim 4 further comprising quantizing using a quantizing resolution which is lower than the first quantizing resolution to compress again the decompressed compressed filtered center video subsection.

6. An apparatus for encoding an input video frame into an output compressed video frame, wherein the input video frame comprising a plurality of surrounding neighboring video subsections surrounding a center video subsection, the apparatus comprising:
   at least a memory;
   one or more processors configured to:
   filter the plurality of surrounding neighboring video subsections;
   compress the filtered plurality of surrounding neighboring video subsections using a first compression method with an associated first compression parameter set;
   filter the center video subsection;
   compress the filtered center video subsection using the first compression method with the associated first compression parameter set;
   decompress the compressed filtered center video subsection using a first decompression method corresponding to the first compression method;
   compress again the decompressed filtered center video subsection using a second compression method;
   form the output compressed video frame wherein the output compressed video frame comprising the plurality of compressed filtered surrounding neighboring video subsections surrounding the compressed again decompressed filtered center video subsection.

7. The apparatus of claim 6 where in the first compression method is inter coding.

8. The apparatus of claim 7 where in the second compression method is intra coding.

9. The apparatus of claim 8 wherein the one or more processors are further configured to quantize using a first quantizing resolution to compress the filtered plurality of surrounding neighboring video subsections.

10. The apparatus of claim 9 wherein the one or more processors are further configured to quantize using a quantizing resolution which is lower than the first quantizing resolution to compress again the decompressed compressed filtered center video subsection.

\* \* \* \* \*